March 17, 1970 R. F. SCHLENKER 3,500,760
PUMP FOR AN ATOMIZER OR THE LIKE
Filed April 22, 1968

INVENTOR.
ROY F. SCHLENKER
BY
Barlow & Barlow
ATTORNEYS

United States Patent Office 3,500,760
Patented Mar. 17, 1970

3,500,760
PUMP FOR AN ATOMIZER OR THE LIKE
Roy F. Schlenker, South Attleboro, Mass., assignor to T. J. Holmes Co. Inc., a corporation of Massachusetts
Filed Apr. 22, 1968, Ser. No. 723,159
Int. Cl. F04b 21/04; G01f 11/06, 11/42
U.S. Cl. 103—188
3 Claims

ABSTRACT OF THE DISCLOSURE

A fluid pump for an atomizer or the like with a flexible piston to provide a seal against the wall of the cylinder in which it operates, to seal against the plunger which engages the piston in a slidable manner to operate the piston, and to seal in closed position with the bushing which limits the upward movement of the piston.

BACKGROUND OF THE INVENTION

A fluid pump such as shown in U.S. Patent 3,257,961 dated June 28, 1966, requires a force fit between the sealing pin and plunger which sometimes results in injury to the head of the pin. Also there is sometimes leakage between the plunger and the piston on the downstroke when the liquid is under pressure and between other assembled parts which leakage is somewhat annoying.

SUMMARY OF THE INVENTION

A sealing pin of rigid material has a snap fit with the plastic plunger eliminating injury to the head of the sealing pin because of the snap fit rather than the force fit above referred to. The piston is provided with a lip at its plunger engaging end and the pressure of the liquid in the cylinder forces this lip outwardly against the plunger so as to provide an effective seal, while radii on the portion of the piston which contact the sealing pin and the bushing improve sealing where liquid has heretofore escaped.

Figures 1, 2, 3, 4:
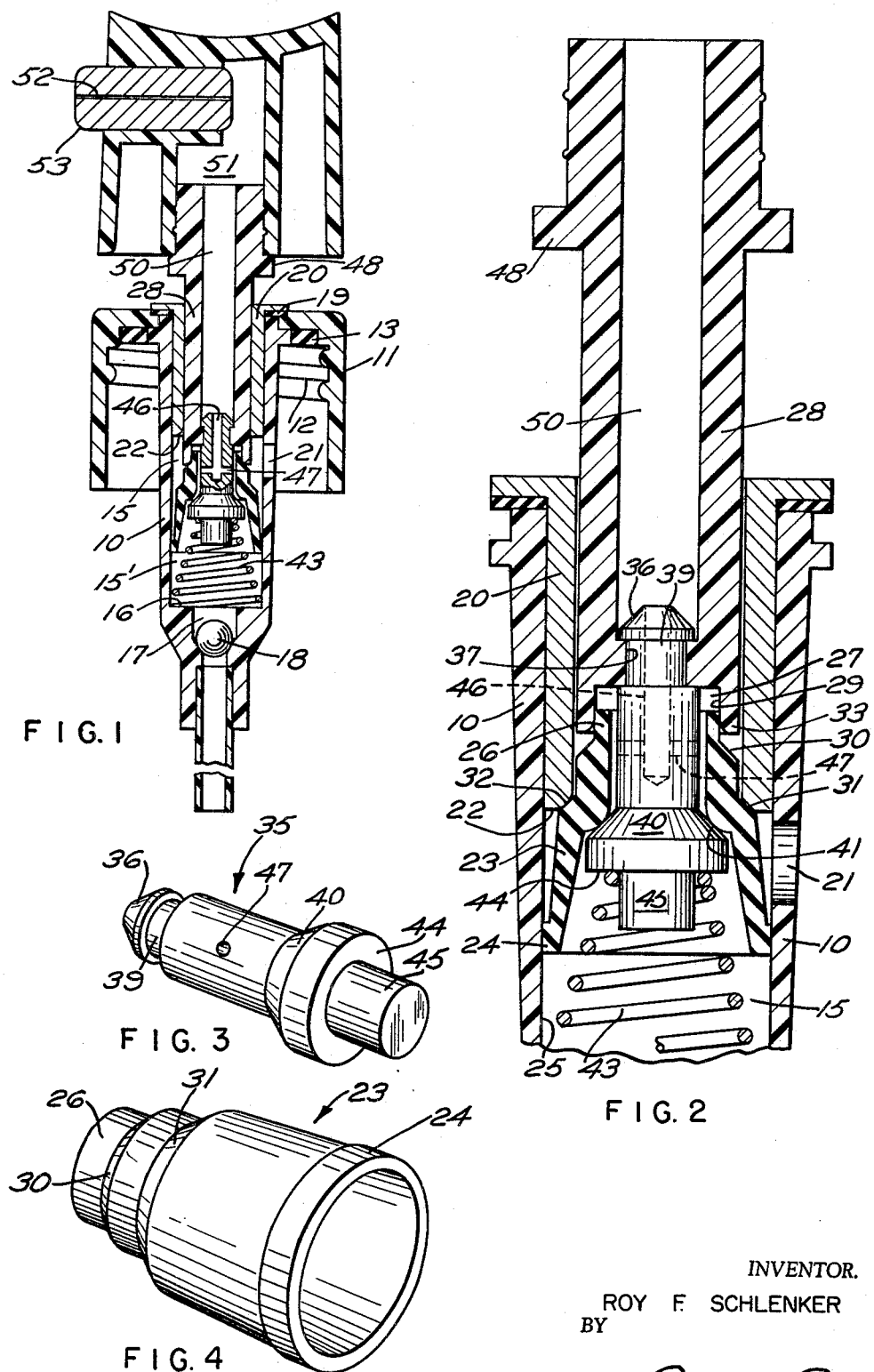
FIG. 1 is a sectional view of the pump with the plunger and piston pushed downwardly for forcing liquid in the chamber outwardly.
FIG. 2 is a sectional view on a larger scale showing the operating parts in closed position.
FIG. 3 is a perspective view of the sealing pin.
FIG. 4 is a perspective view of the piston.

DESCRIPTION OF THE PREFERRED EMBODIMENT 10 designates a cylinder of the pump to which there is attached a screw threaded ferrule 11 having screw threads 12 therein for attachment to a bottle or some container from which the liquid to be dispensed is to be pumped. A washer 13 serves to seal the ferrule to the bottle. The cylinder has a hollow chamber 15 and a bottom wall 16 in which there is an opening 17 for drawing the liquid into the chamber 15 in the portion designated 15' (FIG. 1) through a check valve 18.

A bushing 20 sealed by a washer 19 at the upper end of the cylinder extends inwardly into the cylinder to a location short of the vent opening 21 in the wall of the cylinder. The end 22 of this bushing provides a stop to limit the upward movement of a flexible piston 23 which has a flexible lower end 24 frictionally and sealingly engaging the inner surface 25 of the cylinder and slidable therealong. At its upper end this piston is also provided with a flexible portion 26 which extends into a recess 27 in the plunger 28. This portion 26 frictionally fits in this recess sliding along the wall 29 thereof during actuation of the plunger and piston and at all times maintains a seal with the plunger. The flexible lip portions 24 and 26 are both subjected to liquid pressure in the chamber 15 during the downstroke of the plunger as shown in FIG. 1 which reduces the size of the chamber 15, thus applying pressure upon the liquid therein. This liquid will force both of these lip portions 24 and 26 outwardly causing the portion 24 to more tightly engage the inner surface 25 of the cylinder and the portion 26 to more tightly engage the inner surface of the wall 29 of the recess 27 to maintain a good seal therewith. The greater the pressure, the greater the seal.

Midway between the two flexible end portions, the body portion of the piston is provided with a frusto-conical outer surface 30 and a second frusto-conical outer surface 31. The bushing 20 at its lower edge 22 is provided with an arcuate surface 32 with which the plunger engages in its uppermost or closed position as shown in FIG. 2 to provide a seal. The lower end of the plunger 28 is similarly provided with an arcuate lower inner edge 33 which when the plunger is moved downwardly engages the frusto-conical surface 30 to also provide a good seal therewith.

The plunger 28 is usually of a plastic or deformable material and is equipped with a sealing pin 35 of metal or rigid plastic that is shown in perspective in FIG. 3 and which has a tapered head 36 so that it may be passed through opening 37 at the lower portion of the plunger 28. A neck portion 39 provides shoulders at the ends of the neck so that when passed through the opening 37 these shoulders will engage the shoulders at either end of the opening 37 so as to lock the pin 35 to the plunger. The pin being of rigid material may be easily snapped into this position with the deformable plunger 28 and will be assembled therewith before assembly with the remaining of the structure. This sealing pin is provided with a frusto-conical portion 40 which extends into the lower end of the piston and will engage the arcuate radius 41 of the piston so as to provide a good seal therewith when in the upper or closed position as shown in FIG. 2. The plunger pin and piston are moved to this closed position by a spring 43 engaging the abutment surface 44 of the pin and centered by the projection 45 of somewhat reduced diameter extending from this abutment surface and making a shoulder therewith. This spring engages the bottom wall 16 of the chamber as shown in FIG. 1 to act thereagainst. The pin is provided with an axial opening 46 to which cross openings 47 extend.

The parts are in the closed sealing position as shown in FIG. 2 with the vent hole 21 sealed to the atmosphere and also the chamber 15 is sealed to the atmosphere. In order to effect a pumping action the plunger 28 with its sealing pin 35 is moved downwardly which causes the frusto-conical surface 40 to be moved away from its seal 41 in the piston 23 which is a condition shown in FIG. 1, thus allowing communication from the portion 15' of chamber 15 between the surfaces 40 and 41 in through the radial openings 47 of the pin and axial opening 46 of the pin and upwardly through the central hollow portion 50 of the plunger 28, thence into the area 51 of the cap and out through opening 52 in the nozzle 53. The movement of the plunger 28 and sealing pin 35 will move the plunger so that its surface 29 will slide along the outer surface of the lip portion 26 of the piston to an extent the radius or arcuate surface 33 will engage the frusto-conical portion 30 of the piston and then further movement will cause the piston to be moved downwardly, compressing the spring 43 and applying pressure upon the liquid in the chamber 15 so as to force the liquid up through the passage to the nozzle 52 above pointed out. This plunger may have a descent beyond the extent shown in FIG. 1 until the stop ring 48 engages bushing 20, and at the same time it will be pointed out that venting of the container is provided through the vent hole thence between plunger 28 and bushing 20 as the piston has moved away from the engaged surfaces 31 and 32 to provide a passage to the atmosphere. Upon release of the pressure on the plunger, the spring 43 will move the plunger upwardly, first causing a seal to occur between the frusto-conical portion 40 of the sealing pin 41 of the piston and then causing movement of the piston upwardly until it engages the bushing, causing a seal therewith at the points 31 and 32. This upward movement draws fluid past the check valve 18 into the chamber, and at the same time allows venting to occur from the bottle until sealing of points 31, 32. The bushing does not extend inwardly beyond the vent hole, thus requiring less machining of the bushing than occurred in my previous patent referred to above. Also the formation of the radii to engage the tapered sections provides an effective seal to prevent leakage of the liquid during the downstroke of the plunger.

I claim:

1. In a fluid pump, a cylinder having a wall, a plunger in said cylinder having an axially extending opening therethrough and a recess having an inwardly facing surface at its lower end, a flexible piston having an axially extending opening therethrough and provided with an upper portion which frictionally slidingly engages the said surface of said plunger recess to provide a fluid seal therewith, said piston being more flexible than said plunger and having a radially extending shoulder to be engaged by said plunger to provide a limit of said sliding engagement and cause movement of said piston axially in one direction and means fixed to said plunger and sealingly engaging the piston and limiting longitudinal movement and through which the piston may be urged to move along said slidingly engaged surface in the other direction.

2. In a pump as in claim 1 including a sealing pin fixed to said plunger at the lower end of the axially extending opening, said sealing pin having a portion extending below the end of said plunger that includes an enlarged sealing surface, the lower portion of said piston having radially inward walls to engage the enlarged surface of the sealing pin and seal the axial passage of said plunger.

3. In a pump as in claim 2 wherein said pin has an axial opening at the center thereof and a cross opening leading thereto.

References Cited

UNITED STATES PATENTS

| | | | |
|---|---|---|---|
| 2,144,997 | 1/1939 | Thaheld | 92—182 |
| 3,084,872 | 4/1963 | Corning | 239—333 |
| 3,187,960 | 1/1965 | Gorman | 222—380 |
| 3,228,570 | 1/1966 | Steiman | 222—321 |
| 3,239,151 | 3/1966 | Boris | 239—333 |
| 3,257,961 | 6/1966 | Schlenker | 103—178 |
| 3,403,823 | 10/1968 | O'Donnell | 223—321 |

FOREIGN PATENTS 1,201,684  9/1965  Germany.

WILLIAM L. FREEH, Primary Examiner

U.S. Cl. X.R.

222—321